United States Patent
Nakamura

(10) Patent No.: US 9,858,477 B2
(45) Date of Patent: Jan. 2, 2018

(54) CHARACTER SEGMENTING APPARATUS, CHARACTER RECOGNITION APPARATUS, AND CHARACTER SEGMENTING METHOD

(71) Applicant: NIDEC SANKYO CORPORATION, Suwa-gun, Nagano (JP)

(72) Inventor: Hiroshi Nakamura, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/208,922

(22) Filed: Jul. 13, 2016

(65) Prior Publication Data
US 2017/0017836 A1   Jan. 19, 2017

(30) Foreign Application Priority Data
Jul. 17, 2015   (JP) .................. 2015-142909

(51) Int. Cl.
*G06K 9/00* (2006.01)
*G06K 9/46* (2006.01)
*G06T 7/73* (2017.01)

(52) U.S. Cl.
CPC ........... *G06K 9/00463* (2013.01); *G06K 9/46* (2013.01); *G06T 7/73* (2017.01); *G06K 2009/4666* (2013.01); *G06T 2207/20021* (2013.01); *G06T 2207/20112* (2013.01)

(58) Field of Classification Search
CPC ....... G06K 2009/4666; G06K 9/00463; G06K 9/46; G06T 2207/20021; G06T 2207/20112; G06T 7/0042; G06T 7/73
See application file for complete search history.

(56) References Cited

U.S. PATENT DOCUMENTS

| | | | | |
|---|---|---|---|---|
| 4,931,881 | A * | 6/1990 | Matsui | G06K 9/38 358/464 |
| 5,200,841 | A * | 4/1993 | Kotaki | G06K 9/38 358/2.99 |
| 6,266,156 | B1 * | 7/2001 | Tanimura | H04N 1/40062 358/1.9 |
| 6,898,329 | B1 * | 5/2005 | Takahashi | G06K 9/38 358/3.2 |
| 7,664,297 | B2 * | 2/2010 | Harada | A61B 6/505 382/128 |

(Continued)

FOREIGN PATENT DOCUMENTS

JP   2014130415 A   7/2014

*Primary Examiner* — Jingge Wu
(74) *Attorney, Agent, or Firm* — Cantor Colburn LLP

(57) ABSTRACT

A character segmenting apparatus may include a character segmenting position detecting unit to detect a segmenting position of characters. The character segmenting position detecting unit may include an area setting unit to set up an area for detecting the segmenting position; a projection creating unit configured to create a projection of pixel values, with respect to pixels arranged in a character placement direction, at least in a specified area set up by the area setting unit; a binarizing threshold value obtaining unit to calculate a moving average on the basis of minimum pixel values of the projection, in order to specify the moving average as a binarizing threshold value for the specified area; and a position detecting unit to calculate a character segmenting position on the basis of the binarizing threshold value.

12 Claims, 7 Drawing Sheets

(56) References Cited

U.S. PATENT DOCUMENTS

| | | | |
|---|---|---|---|
| 2004/0240737 A1* | 12/2004 | Lim | G06K 9/325 |
| | | | 382/182 |
| 2005/0008250 A1* | 1/2005 | Lim | G06K 9/00463 |
| | | | 382/266 |
| 2007/0253623 A1* | 11/2007 | Ohira | G06K 9/4638 |
| | | | 382/218 |
| 2009/0284660 A1* | 11/2009 | Lopota | G06T 7/277 |
| | | | 348/607 |
| 2010/0135578 A1* | 6/2010 | Nakamura | G06K 9/38 |
| | | | 382/190 |
| 2016/0292528 A1* | 10/2016 | Nakamura | G06K 9/344 |
| 2017/0193649 A1* | 7/2017 | Gao | G06T 7/90 |

* cited by examiner

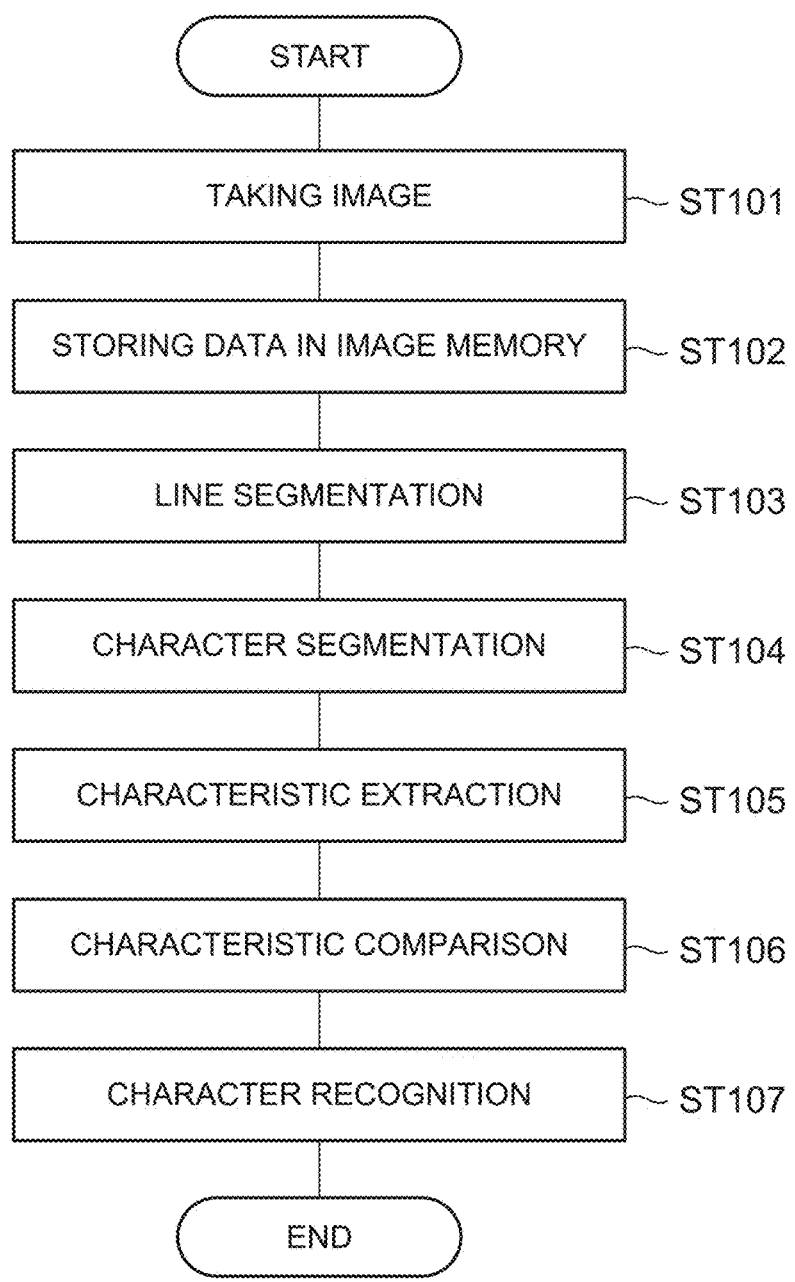

CHARACTER SEGMENTING APPARATUS, CHARACTER RECOGNITION APPARATUS, AND CHARACTER SEGMENTING METHOD

CROSS REFERENCE TO RELATED APPLICATION

The present invention claims priority under 35 U.S.C. §119 to Japanese Application No. 2015-142909 filed Jul. 17, 2015, the entire content of which is incorporated herein by reference.

FIELD OF THE INVENTION

At least an embodiment of the present invention relates to a character recognition technology for segmenting each character out of a character string, by processing a multi-valued digital image datum obtained by way of imaging the character string positioned on a medium made of paper, plastics, and the like; and especially relates to a character segmenting apparatus, a character recognition apparatus, and a character segmenting method for recognizing a character by way of searching for a segmenting position between characters in the character string in an image that has been taken.

BACKGROUND

While there are proposed various methods and apparatuses for carrying out character recognition by using a multi-valued digital image, a recognition target of such a character recognition apparatus is generally a binary image. Then, in the case of a multi-valued image, it is necessary to once binarize the multi-valued image before inputting the datum. Recognition performance of the character recognition apparatus is dependent on accurate segmentation of a character as a recognition target, out of a background that is not the recognition target. In the meantime, as a method in order to determine a binarizing threshold value for binarizing a multi-valued image, for example, there is proposed and disclosed a character recognition apparatus using a discrimination analysis method (for example, refer to Patent Document 1).

Patent Document

Patent Document 1: Japanese Unexamined Patent Application Publication No. 2014-130415

Unfortunately, a discrimination analysis method is a method of binarizing operation by using a value showing a highest segmentation performance, in a histogram including data of pixel values of an entire image, as a threshold value. Therefore, in the case where the number of pixels of a background is overwhelmingly great in comparison with the number of pixels of a line image of a character and the like, as a recognition target, a binarizing threshold value for character segmentation in order to segment the character, for discriminating (distinguishing) and segmenting the character out of the background, is biased toward a background side. As a result, an accuracy of determining the binarizing threshold value is not sufficient, so that there appears a problem that only a low-quality binary image can be obtained, sometimes in the case of a multi-valued digital image.

SUMMARY

Then, at least an embodiment of the present invention provides a character segmenting apparatus, a character recognition apparatus, and a character segmenting method with which it becomes possible to prevent a binarizing threshold value from being biased toward a background side, in such a way as to improve character recognition performance.

A character segmenting apparatus according to at least an embodiment of the present invention is a character segmenting apparatus for segmenting each character out of a character string, by processing an image datum obtained by way of imaging the character string positioned on a recording medium, the character segmenting apparatus comprising: a character segmenting position detecting unit for detecting a segmenting position of characters constituting the character string; wherein, the character segmenting position detecting unit includes: an area setting unit for setting up an area for detecting the segmenting position of characters; a projection creating unit for creating a projection of pixel values, with respect to pixels arranged in a character placement direction in which the characters are placed, at least in a specified area set up by the area setting unit; a binarizing threshold value obtaining unit for calculating a moving average on the basis of minimum pixel values of the projection, in order to specify the moving average as a binarizing threshold value for the specified area; and a position detecting unit for calculating a character segmenting position on the basis of the binarizing threshold value obtained by the binarizing threshold value obtaining unit.

According to at least an embodiment of the present invention, at the time of carrying out an image binarizing process; the projection of pixel values, with respect to pixels arranged in the character placement direction, is calculated in relation to the specified area including a character string as a character recognition target; and the moving average is calculated on the basis of the minimum pixel values of the projection; and then the moving average is used as the binarizing threshold value for the specified area; so that it becomes possible to prevent the binarizing threshold value from being biased toward a background side. Furthermore, in particular; even under conditions of an image in which clarity between a character and a background fluctuates, a binarized process result having a high accuracy can be obtained. Then, as a result, it becomes possible to obtain a favorable binarized image.

The binarizing threshold value obtaining unit may specify an averaged pixel curve as a binarizing threshold value corresponding to a pixel position of the character placement direction, the averaged pixel curve being obtained by way of a moving average process on a minimum pixel curve according to the minimum pixel values of the projection. Thus, the moving average is used as the threshold value so that a tracking performance for a distribution (a brightness distribution) of pixels around an objective pixel is improved; and as a result of that, a favorable binarized image can be obtained.

The binarizing threshold value obtaining unit may create the minimum pixel curve by way of calculating the minimum pixel values of the projection, and calculates a moving average of the minimum pixel curve to carry out smoothing so as to obtain the averaged pixel curve; and then specifies the averaged pixel curve as a binarizing threshold value corresponding to a pixel position of the character placement direction. Thus, the image binarizing process is carried out by way of using an averaged pixel curve obtained by the moving average process on the minimum pixel curve as the binarizing threshold value, with respect to the specified area including a character string as a recognition target; so that the binarizing threshold value can appropriately be specified, and therefore a tracking performance for a distribution (a brightness distribution) of pixels around an objective pixel is improved; and as a result of that, a favorable binarized image can be obtained.

The projection creating unit may create a projection of pixel values, with respect to pixels arranged in a direction perpendicular to the character placement direction. Thus, with respect to a chosen line, it becomes possible to define a position of a character of the line, in a direction perpendicular to the character placement direction.

A character recognition apparatus according to at least an embodiment of the present invention is a character recognition apparatus for segmenting each character out of a character string segmented from an image datum, and recognizing the character, the character recognition apparatus comprising: an image reading unit for imaging the character string positioned on a recording medium, and reading the character string as the image datum; an image memory for storing the image read by the image reading unit; and a data processing unit for segmenting the character string from the image datum stored in the image memory, and segmenting a character out of the character string, and recognizing the character; wherein, the data processing unit includes a character segmenting unit provided with a character segmenting position detecting unit for detecting a segmenting position of characters constituting the character string segmented; and the character segmenting position detecting unit includes: an area setting unit for setting up an area for detecting the segmenting position of characters; a projection creating unit for creating a projection of pixel values, with respect to pixels arranged in a character placement direction in which the characters are placed, at least in a specified area set up by the area setting unit; a binarizing threshold value obtaining unit for calculating a moving_average on the basis of minimum pixel values of the projection, in order to specify the moving average as a binarizing threshold value for the specified area; and a position detecting unit for calculating a character segmenting position on the basis of the binarizing threshold value obtained by the binarizing threshold value obtaining unit.

According to at least an embodiment of the present invention, it becomes possible to prevent the binarizing threshold value from being biased toward a background side. Furthermore, in particular; even under conditions of an image in which clarity between a character and a background fluctuates, a binarized process result having a high accuracy can be obtained; and then, as a result, it becomes possible to obtain a favorable binarized image. As a result of that, character recognition performance can be improved.

Moreover, a character segmenting method according to at least an embodiment of the present invention is a character segmenting method for segmenting each character out of a character string, by processing an image datum obtained by way of imaging the character string positioned on a recording medium, the character segmenting method comprising: a step of detecting a character segmenting position for detecting a segmenting position of characters constituting the character string; wherein, the step of detecting a character segmenting position includes: a step of setting an area in order to set up an area for detecting the segmenting position of characters; a step of creating a projection in order to create a projection of pixel values, with respect to pixels arranged in a character placement direction in which the characters are placed, at least in a specified area set up by the step of setting an area; a step of obtaining a binarizing threshold value in order to calculate a moving average on the basis of minimum pixel values of the projection, and to specify the moving average as a binarizing threshold value for the specified area; and a step of detecting a position in order to calculate a character segmenting position on the basis of the binarizing threshold value obtained by the step of obtaining a binarizing threshold value.

According to at least an embodiment of the present invention, at the time of carrying out the image binarizing process; the projection of pixel values, with respect to pixels arranged in the character placement direction, is calculated in relation to the specified area including a character string as a character recognition target; and the moving average is calculated on the basis of the minimum pixel values of the projection; and then the moving average is used as the threshold value for the specified area; so that it becomes possible to prevent the binarizing threshold value from being biased toward a background side. Furthermore, in particular; even under conditions of an image in which_clarity between a character and a background fluctuates, a binarized process result having a high accuracy can be obtained. Then, as a result, it becomes possible to obtain a favorable binarized image.

According to at least an embodiment of the present invention, it becomes possible to prevent a binarizing threshold value from being biased toward a background side, in such a way that it becomes possible to improve character recognition performance. Furthermore, in particular; even under conditions of an image in which clarity between a character and a background fluctuates, a binarized process result having a high accuracy can be obtained. Then, as a result, it becomes possible to obtain a favorable binarized image.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is a flowchart for explaining operation of the character recognition apparatus according to the present embodiment.

DETAILED DESCRIPTION

Embodiments of the present invention are described below in association with the accompanying drawings.

Figure 1:
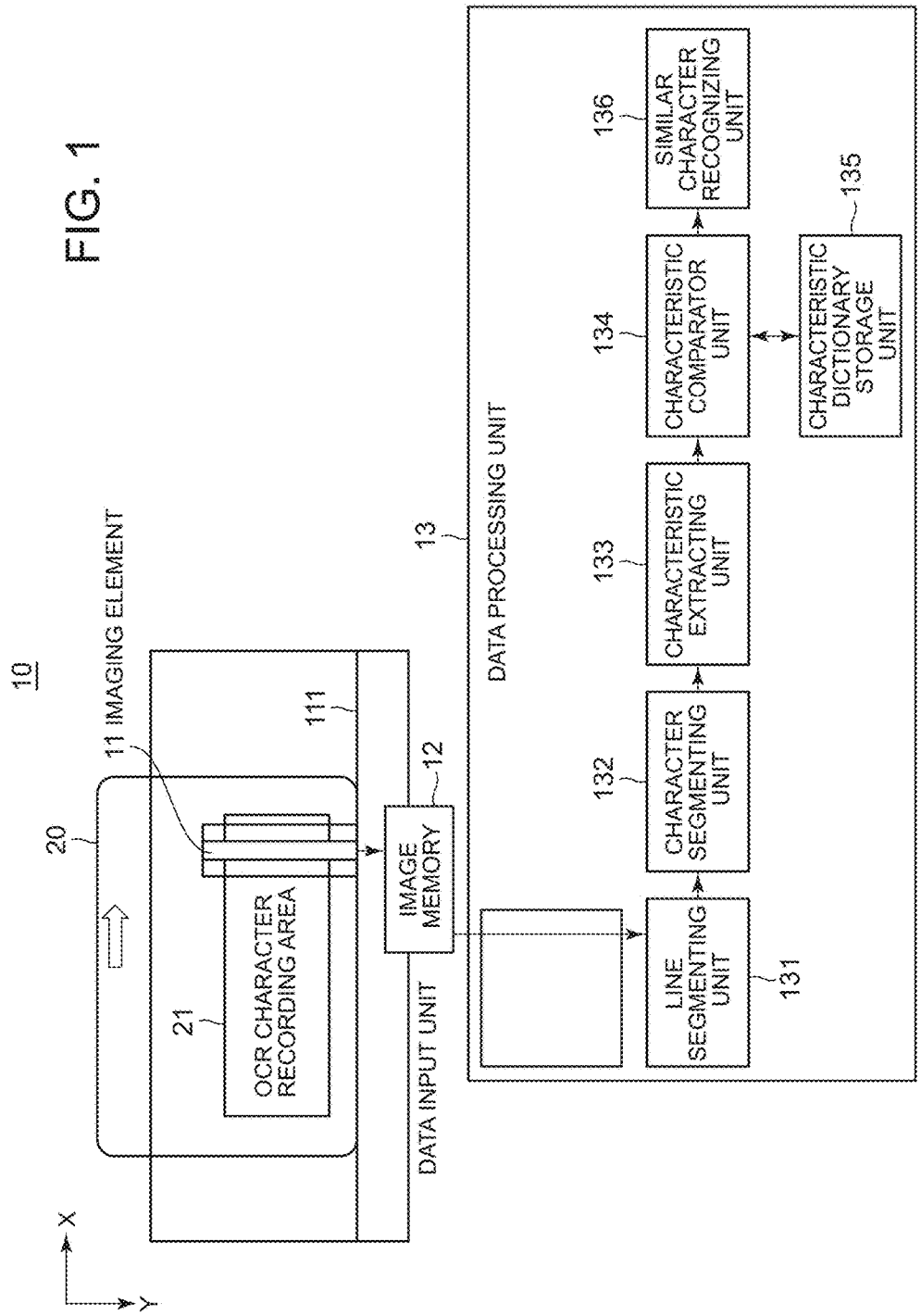
FIG. 1 is a diagram showing a configuration example of a character recognition apparatus according to an embodiment of the present invention.

FIG. 1 is a diagram showing a configuration example of a character recognition apparatus according to an embodiment of the present invention.

A character recognition apparatus 10 according to the present embodiment has a function of segmenting each character out of a character string segmented from an image datum and recognizing the character, by means of processing a digital image datum obtained by taking an image of the character string placed on a recording medium made of paper, plastics, and the like.

The character recognition apparatus 10 carries out characteristic operation as described below, based on an image recognition technology, at the time of detecting (searching for) a segmenting position between characters in the character string inside the image that has been taken. The character recognition apparatus 10 specifies a temporary segmenting area; for example, a rectangular area; which surrounds a plurality of characters, i.e., two or more characters, as a recognition target (a segmentation target). Then, in the rectangular area (the specified area), the character recognition apparatus 10 creates (forms) a first projection with respect to pixel values in a character placement direction which the characters are placed in, and a second projection with respect to pixel values in a direction perpendicular to the character placement direction.

As an example, in the rectangular area (the specified area); the character recognition apparatus 10 creates a first projection 'PX' of pixel values with respect to pixels arranged in the character placement direction (i.e., in an X-axis direction) in which the characters are placed, and a second projection 'PY' of pixel values with respect to pixels arranged in a direction (i.e., in a Y-axis direction) perpendicular to the character placement direction.

In the character recognition apparatus 10, the first projection 'PX' is formed in order to obtain a binarizing threshold value for binarizing an image. Meanwhile, the second projection 'PY' is formed in order to define a position of a character of a chosen line, in a direction perpendicular to the character placement direction, in the line. In the present embodiment, basically the second projection 'PY' is not used for obtaining the binarizing threshold value for binarizing an image. Incidentally, it is also possible to calculate a binarizing threshold value by applying a discrimination analysis method while assuming each of the first projection 'PX' and the second projection 'PY' to be an image.

In the present embodiment, the character recognition apparatus 10 calculates a moving average 'PXA', on the basis of minimum pixel values; for example, minimum brightness values; of the first projection 'PX', and then specifies the moving average 'PXA' to be a threshold value of the rectangular area (specified area). More specifically to describe, the character recognition apparatus 10 creates a minimum pixel curve (a minimum brightness curve), by way of calculating the minimum pixel values (the minimum brightness values, in the case of the present embodiment) of the first projection 'PX'; and calculates a moving average of the minimum pixel curve (the minimum brightness curve) to carry out smoothing on the datum so as to obtain an averaged pixel curve (an averaged brightness curve). Then, the character recognition apparatus 10 specifies the averaged pixel curve (the averaged brightness curve) as a threshold value corresponding to a pixel position of the character placement direction in the rectangular area (specified area). Then, the character recognition apparatus 10 calculates a character segmenting position, on the basis of the binarizing threshold value obtained. A concrete process and the like, in order to obtain the binarizing threshold value, is described later in detail.

Incidentally, in the present embodiment; a "moving average" means an average of n-pieces of data, either being weighted or not weighted, wherein the data are immediate and consecutive in the minimum pixel curve with respect to the minimum pixel values obtained from the first projection 'PX'. Then, a curve according to the moving average is an averaged pixel curve. In the present embodiment, the averaged pixel curve is used as a threshold value for an image binarizing process.

A specific configuration of the character recognition apparatus 10 and a function of character recognition processing by the character recognition apparatus 10 for a taken image are explained below:

As shown in FIG. 1, the character recognition apparatus 10 includes: a contact-type (for example, a one-dimensional type) imaging element 11 (image reading unit) as a data input unit, an image memory 12, and a data processing unit 13. Then, the data processing unit 13 has: a line segmenting unit 131 as a character string segmenting unit, a character segmenting unit 132 including a character segmenting position detecting unit, a characteristic extracting unit 133, a characteristic comparator unit 134, a characteristic dictionary storage unit 135, and a similar character recognizing unit 136. Incidentally, these units behave as an example of a character recognition unit for recognizing a character string placed on a recording medium 20, for example, an OCR character string. Incidentally, a direction of transferring the recording medium 20 in FIG. 1 is represented as an X-axis direction, and meanwhile a direction perpendicular to the X-axis direction is represented as a Y-axis direction. Moreover, in the present embodiment; to make a simple explanation, a direction of an OCR character string formed in an OCR character recording area 21, namely a direction in which characters are laid out, is set to be consistent with the X-axis direction, as shown in FIG. 1. Then, a direction perpendicular to the X-axis direction is set to be consistent with the Y-axis direction. Concretely to describe, a direction perpendicular to the direction, in which the characters are laid out, is the Y-axis direction.

The imaging element 11 as an image reading unit takes an image of an OCR character string of the OCR character recording area 21 placed on the recording medium 20, and then carries out photoelectric conversion of the OCR character string.

The image memory 12 memorizes (stores) the digitalized image datum, such as the OCR character string and the like, imaged by the imaging element 11. An original image stored in the image memory 12 is formed in such a way that a plurality of pixels are arranged in a matrix; and concretely to describe, although not being illustrated, the pixels are arranged in the matrix including "M" rows in the X-axis direction and "N" columns in the Y-axis direction. Each of the pixels has a pixel value (brightness value). In the present embodiment; for example, being expressed with an eight-bit value, each pixel value is one of values in a range of 0 to 255. The pixel value is smaller, when being closer to black; and in the meantime, the pixel value is greater, when being closer to white. Incidentally, the image memory 12 may be materialized with any device; such as a RAM, an SDRAM, a DDRSDRAM, an RDRAM, and the like, as long as the device can store an image datum.

In the data input unit; with respect to an OCR character string printed in the OCR character recording area 21 of the recording medium 20 such as a card, at a time when the recording medium 20 is transferred along a transfer guide of a medium transfer mechanism 111, a character pattern of the OCR character string is imaged by the imaging element 11, and a photoelectric conversion is carried out, and then the image datum is stored in the image memory 12. A configuration is made in such a way that; subsequently, the data processing unit 13 reads out the image datum from the image memory 12, and carries out various processes at each of the units described above, so as to finally segment each character out of the OCR character string placed on the recording medium 20 and recognize the character.

Although a contact-type one-dimensional imaging element is employed in the present case example, as the imaging element 11 for the purpose of downsizing the device and others, it is also possible to apply a two-dimensional area sensor and the like, as the imaging element 11, which aims at the character string of the reading-targeted recording medium 20 as a reading target. In the meantime, the imaging element 11 is materialized, for example, by use of a CCD or a CMOS sensor.

The recording medium 20 may also be a commonly-used card in conformity with JIS, such as a plastic card having a size of a width of 86 mm, a height of 54 mm, and a thickness of 0.76 mm; moreover, it may be an ID card, a passport book, a driver license, and the like.

(Configuration and Function of each Unit in the Data Processing Unit 13)

Explained next are fundamental configuration and functions of each unit of the data processing unit 13. The data processing unit 13 reads out a multi-valued image datum (a gray-scale image of a multi-level mode, such as a 256-level mode) from the image memory 12.

The line segmenting unit 131 as a character string segmenting unit carries out a binarizing process with respect to the gray-scale image datum of a 256-level mode, which has been read out from the image memory 12. While a threshold value is calculated by using an appropriate method, an original multi-valued gray-scale image is converted into a black-and-white binary image. Subsequently, the line segmenting unit 131 carries out line segmenting operation, while identifying a center position between an upper edge and a lower edge as a center line of a character string. Concretely to describe, for the binarized image datum, a projection is created in a direction which characters are placed in; namely, in the X-axis direction; with respect to the character string formed in the OCR character recording area 21, in order to detect the upper and lower edges of the character string.

Out of the character string segmented by the line segmenting unit 131, the character segmenting unit 132 detects a segmenting position between characters in the direction (the X-axis direction) which characters of the character string are placed in, so as to carry out a character segmenting process. More specifically to describe; the character segmenting unit 132 specifies a temporary segmenting area; for example, a rectangular area (including "m" rows by "n" columns, wherein "m"<"M" and "n"<"N"); which surrounds a plurality of characters, i.e., two or more characters, as a recognition target (a segmentation target). Then, in the rectangular area (the specified area), the character segmenting unit 132 creates a first projection 'PX' with respect to pixel values in a direction (the X-axis direction) which the characters are placed in. Moreover, the character segmenting unit 132 creates (forms) a second projection 'PY' with respect to pixel values in a direction (the Y-axis direction) perpendicular to the character placement direction.

In the present embodiment, the first projection 'PX' onto the X-axis shows a minimum pixel value obtained as a pixel value for pixels placed in a column, with respect to the pixels placed in the column in the Y-axis direction, in the image of the character string. In this context, the "minimum pixel value" represents a minimum pixel value among pixel values, with respect to the pixels placed in the row. In other words, a minimum brightness value is taken among multi-leveled brightness values (for example, having a value that can be expressed as an eight-bit value and the like) as pixel information of each pixel, and then the brightness value is defined as the minimum pixel value in the column. Thus, in the specified rectangular area (including "m" rows by "n" columns, wherein "m"<"M" and "n"<"N") (the specified area); the first projection 'PX' with regard to the minimum pixel value is created, for each column of the "n" columns, in the direction (the X-axis direction) which the characters are placed in.

Subsequently in the same way; the character segmenting unit 132 calculates the second projection 'PY' onto the Y-axis, with respect to the rectangular area. the second projection 'PY' onto the Y-axis shows a minimum pixel value obtained as a pixel value for pixels placed in a row, with respect to the pixels placed in the row in the X-axis direction, in the image of the character string. In this context, the "minimum pixel value" represents a minimum pixel value among pixel values, with respect to the pixels placed in the row. In other words, a minimum brightness value is taken among multi-leveled brightness values (for example, having a value that can be expressed as an eight-bit value and the like) as pixel information of each pixel, and then the brightness value is defined as the minimum pixel value in the row. Thus, in the specified rectangular area (including "m" rows by "n" columns, wherein "m"<"M" and "n"<"N") (the specified area); the second projection 'PY' with regard to the minimum pixel value is created, for each row of the "m" rows, in the direction (the Y-axis direction) perpendicular to the direction which the characters are placed in.

Incidentally, in the present embodiment; the second projection 'PY' is formed in order to define a position of a character of a chosen line, in a direction perpendicular to the character placement direction, in the line. Basically, the second projection 'PY' is not used in order to obtain a binarizing threshold value for binarizing an image.

Next, the character segmenting unit 132 calculates a moving average 'PXA' on the basis of the minimum pixel values of the first projection 'PX'; which is the minimum brightness value in the present embodiment; and then the moving average 'PXA' is specified as a threshold value for the rectangular area (the specified area). More specifically to describe, the character segmenting unit 132 creates a minimum pixel curve (a minimum brightness curve), by way of calculating the minimum pixel values (the minimum brightness values, in the case of the present embodiment) of the first projection 'PX'; and calculates a moving average of the minimum pixel curve (the minimum brightness curve) to carry out smoothing on the datum so as to obtain an averaged pixel curve (an averaged brightness curve); and then the averaged pixel curve (the averaged brightness curve) is obtained as a binarizing threshold value for segmenting a character in the rectangular area (the specified area).

Then, the character segmenting unit 132 calculates a character segmenting position on the basis of the binarizing threshold value obtained.

Incidentally, a character segmenting process in the character segmenting unit 132 is described later more in detail.

When the character segmenting process by the character segmenting unit 132 finishes in the data processing unit 13, a circumscribing rectangular area (i.e., coordinate values of an upper end, a lower end, a right end, and a left end) of characters as a recognition target is calculated.

The characteristic extracting unit 133 divides the circumscribing rectangular area, described above, into arbitrary sub areas; for example, divides one circumscribing rectangular area into 5×5 areas. Then, each of those divided areas is dealt with as a sub area; and with respect to the sub area, a ratio of the number of black pixels to the number of all pixels in the sub area is calculated in order to create a characteristic vector that includes the calculated ratio as an element.

The characteristic comparator unit 134 makes a comparison between the characteristic vector, calculated by the characteristic extracting unit 133, and reference characteristic vectors calculated in advance with regard to all characters to be used for the recording medium, and sets up a character corresponding to a reference characteristic vector, which shows a highest level of similarity (for example, a normalized correlation coefficient), as a candidate character.

Incidentally, the reference characteristic vectors are stored in advance in the characteristic dictionary storage unit 135. At a time of making a characteristic comparison, a datum of a character with a high level of similarity is read out from the characteristic dictionary storage unit 135, and then the characteristic comparison is made in the characteristic comparator unit 134.

Basically, the similar character recognizing unit 136 recognizes the candidate character, which is set up by means of the characteristic comparison in the characteristic comparator unit 134, as a character used in the recording medium.
(Obtaining a Binarizing Threshold Value for Segmenting a Character & Others in the Character Segmenting Position Detecting Unit)

Explained next are obtaining a binarizing threshold value for segmenting a character, and a character segmenting position detecting process (a character segmenting process) in the character segmenting position detecting unit of the character segmenting unit 132 that has a characteristic function in the character recognition apparatus 10 according to the present embodiment.
(Block Configuration of the Character Segmenting Unit 132)

Figure 2:
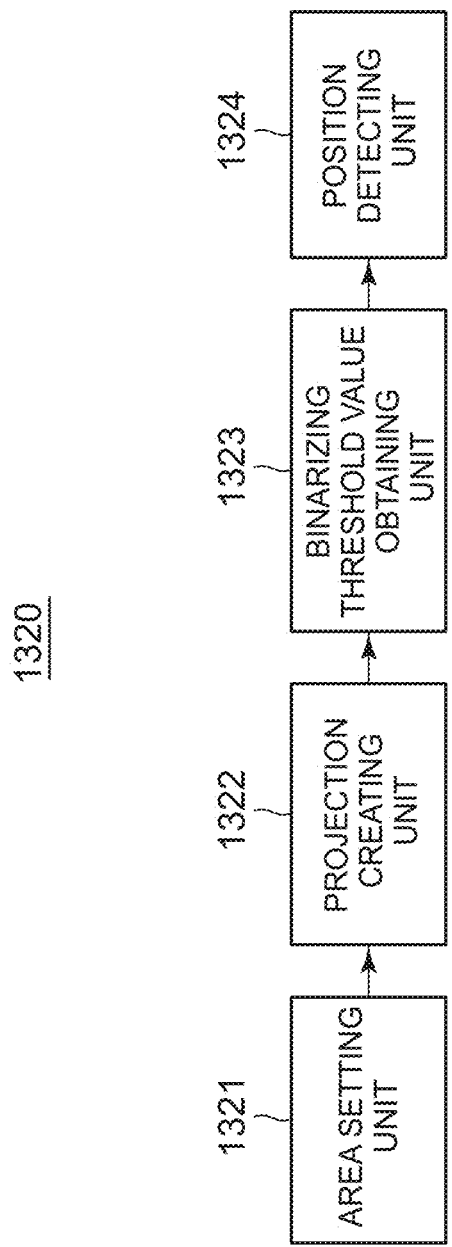
FIG. 2 is a block diagram showing a configuration example of a character segmenting position detecting unit in a character segmenting unit according to the present embodiment.

FIG. 2 is a block diagram showing a configuration example of a character segmenting position detecting unit in a character segmenting unit according to the present embodiment. A character segmenting position detecting unit 1320 in the character segmenting unit 132 according to the present embodiment is so configured as to include; an area setting unit 1321, a projection creating unit 1322, a binarizing threshold value obtaining unit 1323, and a position detecting unit 1324, as shown in FIG.2.

The area setting unit 1321 sets up a temporary rectangular segmenting area (a rectangular area) 'RCTA'; which surrounds a plurality of characters, i.e., two or more characters being adjacent or continuously adjacent in a recognition target, with respect to a character string of a line segmented by the line segmenting unit 131.

The projection creating unit 1322 creates a projection in the rectangular area 'RCTA' set up by the area setting unit 1321. Concretely to describe, in the rectangular area 'RCTA' set up by the area setting unit 1321, the projection creating unit 1322 creates a first projection 'PX' of pixel values onto the X-axis, with respect to pixels arranged in the X-axis direction in which the characters are placed, and a second projection 'PY' of pixel values onto the Y-axis, with respect to pixels arranged in the Y-axis direction. Incidentally, in this context, a pixel value (a brightness value) of each pixel is processed as a multi-valued image datum of the gray-scale image stored in the image memory 12.

More concretely to describe, in the rectangular area 'RCTA' set up by the area setting unit 1321, the projection creating unit 1322 creates the first projection 'PX' of minimum pixel values onto the X-axis, with respect to pixels arranged in the X-axis direction, and the second projection 'PY' of minimum pixel values onto the Y-axis, with respect to pixels arranged in the Y-axis direction. Incidentally, as described earlier; in the present embodiment, the second projection 'PY' is formed in order to define a position of a character of a chosen line, in a direction perpendicular to the character placement direction, in the line. Basically, in the binarizing threshold value obtaining unit 1323, the second projection 'PY' is not used in order to obtain a binarizing threshold value for binarizing an image.

The binarizing threshold value obtaining unit 1323 calculates a moving average 'PXA' on the basis of the minimum pixel values of the first projection 'PX' created in the projection creating unit 1322; which are the minimum brightness values in the present embodiment; and then the moving average 'PXA' is specified as a threshold value for the rectangular area 'RCTA' (the specified area). More specifically to describe, the binarizing threshold value obtaining unit 1323 creates a minimum pixel curve (a minimum brightness curve), by way of calculating the minimum pixel values (the minimum brightness values, in the case of the present embodiment) of the first projection 'PX' created in the projection creating unit 1322; and calculates a moving average of the minimum pixel curve (the minimum brightness curve) to carry out smoothing on the datum so as to obtain an averaged pixel curve (an averaged brightness curve); and then the averaged pixel curve (the averaged brightness curve) is obtained as a binarizing threshold value for segmenting a character in the rectangular area 'RCTA' (the specified area).

The position detecting unit 1324 calculates a character segmenting position on the basis of the binarizing threshold value obtained in the binarizing threshold value obtaining unit 1323. The position detecting unit 1324 calculates a character segmenting position, as a result of a comparison between the binarizing threshold value and a level value in a projection profile, by way of identifying an interval, where the level value in the projection profile exceeds the binarizing threshold value, as a space between two characters. The position detecting unit 1324 judges an interval, where the level value in the projection profile exceeds the binarizing threshold value, to be a space between two characters; and then identifies a border position, for example, at a middle point of the space.

Incidentally, in the present embodiment, the projection creating unit 1322 is so configured as to create a projection in the rectangular area 'RCTA' set up by the area setting unit 1321.

A reason and others why a configuration of the character segmenting unit of the present embodiment is applied are explained in the following descriptions, while operation of the character segmenting unit according to the present embodiment is explained. Then, a further concrete example of the operation of the character segmenting unit according to the present embodiment is subsequently explained.

Figure 3:
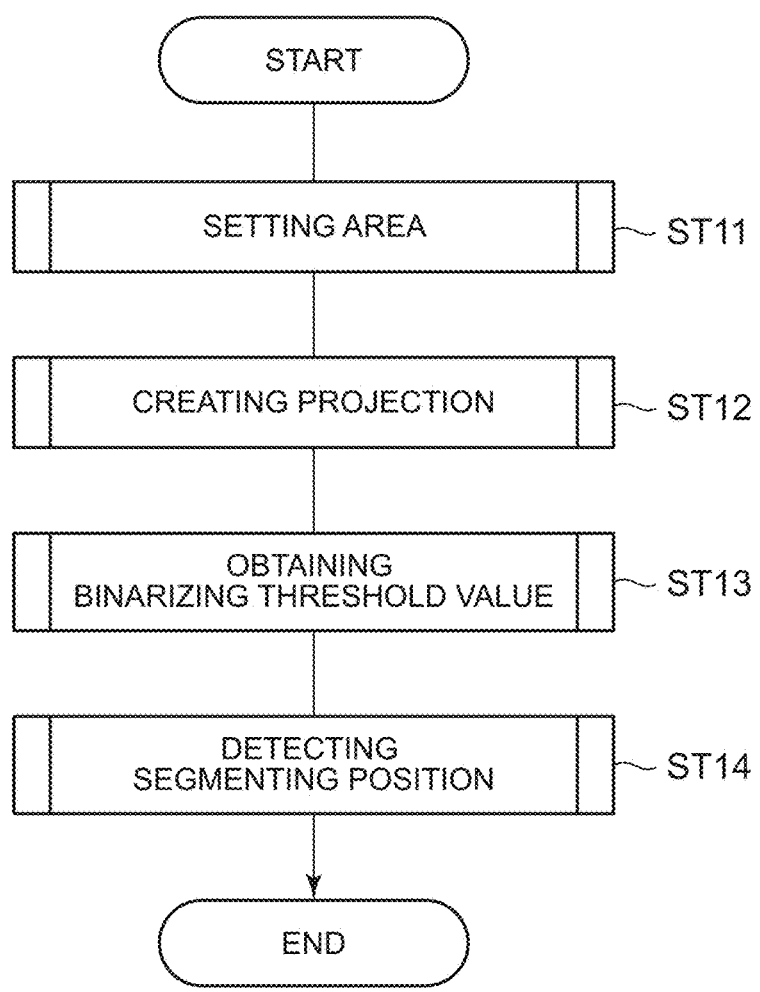
FIG. 3 is a flowchart showing a process flow of the character segmenting position detecting unit in the character segmenting unit according to the present embodiment.

FIG. 3 is a flowchart showing a process flow of the character segmenting position detecting unit in the character segmenting unit according to the present embodiment.

As described above, basically the character segmenting unit 132 detects (searches for) a character segmenting position in a horizontal direction for each character string. Then, a configuration as shown in FIG. 2 is applied in the present embodiment.

(Detection of a Character Segmenting Position in the Present Embodiment)

In the character segmenting position detecting unit 1320 shown in FIG. 2, at first the area setting unit 1321 sets up a temporary rectangular segmenting area (a rectangular area) 'RCTA'; which surrounds a plurality of characters, i.e., two or more characters being adjacent in a recognition target, at Step ST11, as shown in FIG. 3. Next, at Step ST12, the projection creating unit 1322 creates the first projection 'PX' of minimum pixel values, with respect to pixels arranged in the X-axis direction, and the second projection 'FY' of minimum pixel values, with respect to pixels arranged in the Y-axis direction, in the rectangular area 'RCTA' set by the area setting unit 1321. In a gray-scale image datum of a 256-level mode, stored in each pixel, a minimum pixel value is chosen.

Next, at Step ST13, the binarizing threshold value obtaining unit 1323 creates a minimum pixel curve, by way of calculating the minimum pixel values of the first projection 'PX' created in the projection creating unit 1322; and calculates a moving average of the minimum pixel curve to carry out smoothing on the datum so as to obtain an averaged pixel curve; and then the averaged pixel curve is obtained as a binarizing threshold value for segmenting a character in the rectangular area 'RCTA' (the specified area).

Then, at Step ST14, the position detecting unit 1324 calculates a character segmenting position on the basis of the binarizing threshold value obtained in the binarizing threshold value obtaining unit 1323. The position detecting unit 1324 calculates a character segmenting position, as a result of a comparison between the binarizing threshold value and a level value in a projection profile, by way of identifying an interval, where the level value in the projection profile exceeds the binarizing threshold value, as a space between two characters. The position detecting unit 1324 judges an interval, where the level value in the projection profile exceeds the binarizing threshold value, to be a space between two characters; and then, for example, a middle point of the space is obtained as a border position.

(Concrete Example of a Character Segmenting Process of the Present Embodiment)

Next, an example of a character segmenting process by the character segmenting position detecting unit 1320 in the character segmenting unit 132, having characteristics described above, is concretely explained in association with FIG. 4 through FIG. 8.

Figure 4:
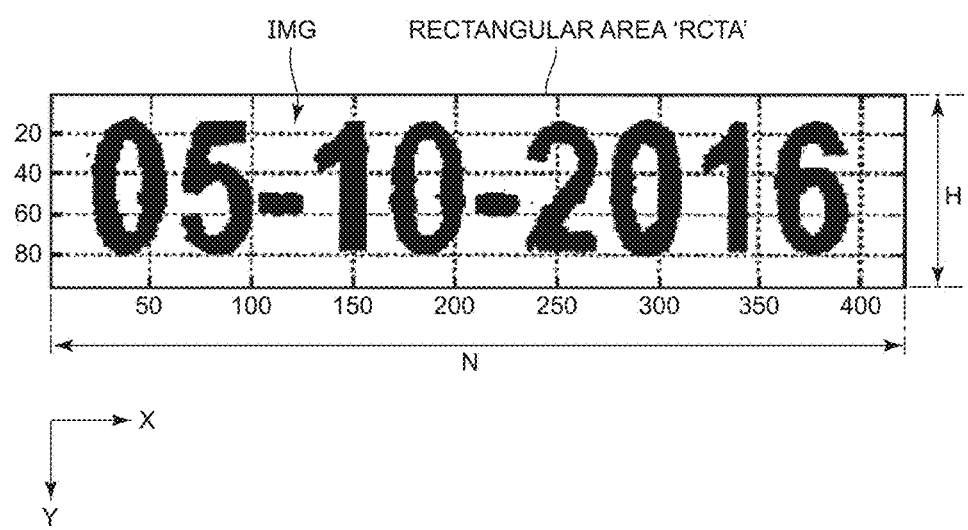
FIG. 4 is a diagram showing an example of an image as a character recognition target, and an example of a rectangular area to be set up for a part of the image by an area setting unit, according to the present embodiment.

FIG. 4 is a diagram showing an example of an image as a character recognition target, and an example of a rectangular area to be specified for a part of the image by an area setting unit, according to the present embodiment.

Figure 5C:
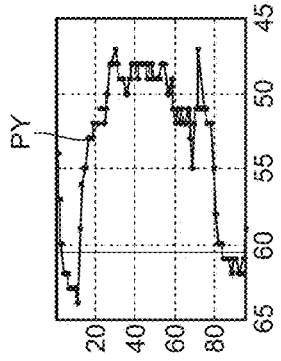
FIGS. 5A, 5B, and 5C are diagrams showing a projection profile created by a projection creating unit according to the present embodiment, wherein the projection profile being shown in relation to the rectangular area.
Figure 5A:
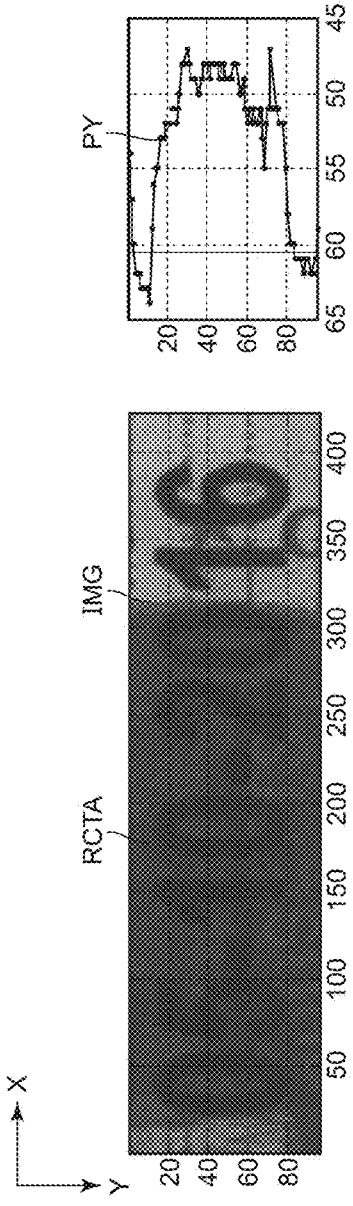
Figure 5B:
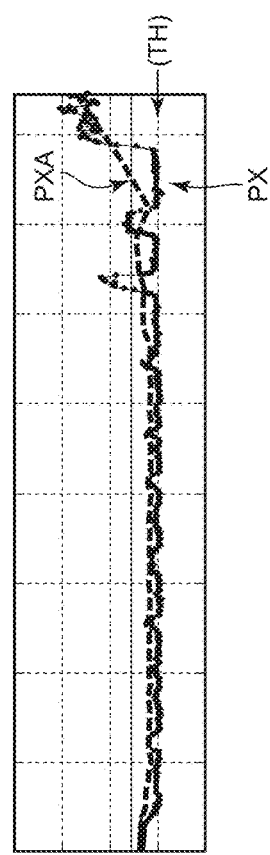
Figure 6:
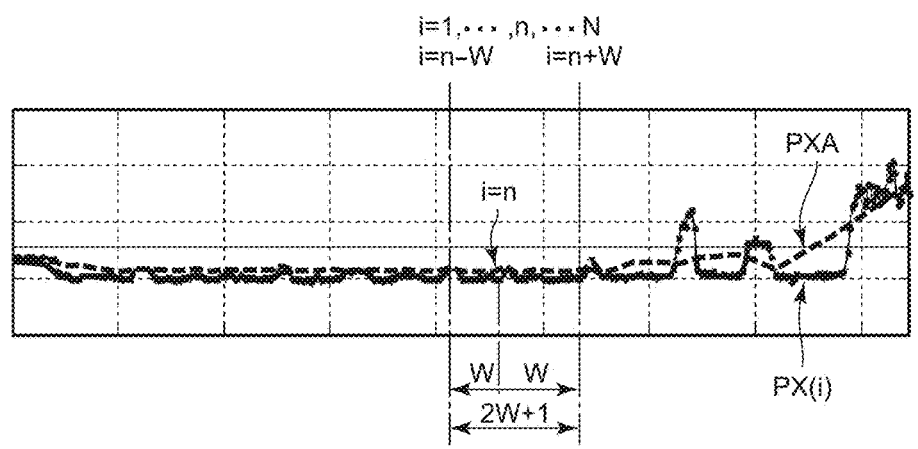
FIG. 6 is a diagram for explaining a process in order to calculate a moving average on a minimum pixel curve of minimum pixel values of a first projection in a binarizing threshold value obtaining unit according to the present embodiment, and to specify the moving average as a threshold value for the rectangular area (a specified area).
Figure 7:
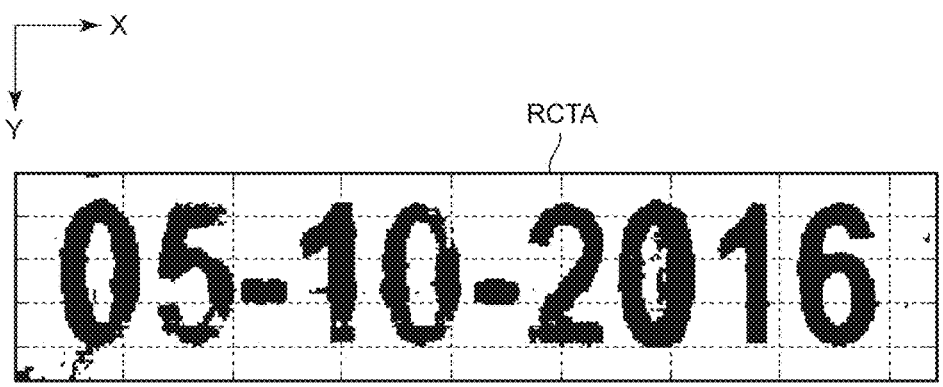
FIG. 7 is a diagram showing a binarized image obtained by use of a binarizing threshold value obtained by applying at least an embodiment of the present invention.

FIG. 5 is a diagram showing a projection profile created by a projection creating unit according to the present embodiment, wherein the projection profile being shown in relation to the rectangular area. FIG. 5A shows the rectangular area 'RCTA' and a character string, and FIG. 5B represents a profile of the first projection 'PX' onto the X-axis, and FIG. 5C represents a profile of the second projection 'FY' onto the Y-axis. FIG. 6 is a diagram for explaining a process in order to calculate the moving average 'PXA' in a minimum pixel curve of minimum pixel values of the first projection 'PX' in the binarizing threshold value obtaining unit according to the present embodiment, and to specify the moving average 'PXA' as a threshold value for the rectangular area (the specified area). FIG. 7 is a diagram showing a binarized image obtained by use of a binarizing threshold value obtained by applying at least an embodiment of the present invention.

Incidentally, as described earlier; a minimum pixel value in a vertical line or a horizontal line can be used as a pixel value for pixels, as shown in an example of FIG. 5. In this case, the character segmenting unit 132 is provided in advance with a command that a minimum pixel value, in a line of the Y-axis direction or a line of the X-axis direction, is to be used as a pixel value for pixels. The character segmenting unit 132 is configured in such a way that a processing system for obtaining a projection also carries out operation by using a minimum value of the pixel value as specified.

It is herewith assumed that an image 'IMG' for carrying out a character recognition is provided, as shown in FIG. 5. The image shown in FIG. 5 represents an example in which clarity between a character string and a background is significantly deteriorated totally or partially. In the meantime, the image shown in FIG. 4 represents an example of a basic image in which a background is uniform.

In the example of FIG. 4, there is shown an image of a character string including characters; '0', '5', '-', '1', '0', '-', '2', '0', '1', and '6'. The image shown in FIG. 5 represents an example where clarity between a character string and a background is significantly deteriorated totally or partially in the image of FIG. 4. The character string is corresponding to, for example, an image datum in the case where a character printed in the OCR character recording area 21 of the recording medium 20 is imaged. Incidentally, an arrangement of the numerals shown in FIG. 4, for example, represents a case example in which only a numeral part of an expiration date (Month 05-Date 10Year 2016) of a recording medium and the like is selectively read out. A renewal deadline of a driver's license can be given as another example of such an arrangement of the numerals.

In the examples of FIG. 4 and FIG. 5; the characters '0' and '5' are placed side by side, the characters '5' and '-' are placed side by side, the characters '-' and '1' are placed side by side, the characters '1' and '0' are placed side by side, the characters '0' and '-' are placed side by side, the characters '-' and '2' are placed side by side, the characters '2' and '0' are placed side by side, the characters '0' and '1' are placed side by side, and the characters '1' and '6' are placed side by side, in the character placement direction (the X-axis direction).

Then, in the examples of FIG. 4 and FIG. 5; each interval, namely between the characters '0' and '5', between the characters '-' and '1', between the characters '1' and '0', between the characters '0' and '-', between the characters '-' and '2', between the characters '2' and '0', between the characters '0' and '1', between the characters '1' and '6' is a wide gap (space) so that a boundary between the two characters in each of those couples is clear. In the meantime, an interval between the characters '5' and '-' is a narrow gap (space) so that a boundary between the characters '5' and '-' is not so clear as the boundary between the two characters in each of other couples mentioned above.

In the character segmenting position detecting unit 1320 of the character segmenting unit 132 of the character recognition apparatus 10, at first the area setting unit 1321 carries out area setting, for a character string after line segmentation (Step ST11 shown in FIG. 3). Namely, the area setting unit 1321 sets up a rectangular area 'RCTA' in such a way as to include an entire part of a plurality of characters as a recognition target. In this case, the rectangular area 'RCTA' is set up in such a way as to surround the numeral string (character string) "05-10-2016", as shown in FIG. 5. Incidentally, clarity between a character string and a background in the image shown in FIG. 5 is significantly deteriorated totally or partially, when a comparison is made between the image shown in FIG. 5 and the image shown in FIG. 4.

If a position of the character string is already known, a height 'H' (in the Y-axis direction) of the rectangular area 'RCTA' is determined in the area setting unit 1321, on the basis of the known information. If the position of the character string is not known, it is only necessary to determine the position of the character string in the Y-axis direction, by use of an appropriate method, and define positions of an upper edge and a lower edge of the rectangular area 'RCTA', on the basis of the information determined.

If the position of the character string is constant, a width 'N' of the rectangular area 'RCTA' is determined on the basis of a datum with regard to the standard position. If the position in the character placement direction is not constant, it is only necessary to determine the position of the character string in the X-axis direction, by use of an appropriate method, and define positions of a right side edge and a left side edge of the rectangular area, on the basis of a datum determined. Meanwhile, an adequate margin from an actual edge position of the characters may be obtained, while taking into account an error of a character position.

Next, the projection creating unit 1322 carries out a process of creating a projection (Step ST12 shown in FIG. 3). The projection is created by projecting the image of the characters onto the X-axis or the Y-axis. FIG. 5B and FIG. 5C show characteristic curves (profiles) of the projection 'PX' and the projection 'TY', as a result of calculating the first projection and the second projection of minimum pixel values, respectively; with respect to a part of the numeral string (character string) "05-10-2016" represented in FIG. 5. In other words, at Step ST 12; in the rectangular area 'RCTA' set up by the area setting unit 1321, the projection creating unit 1322 creates the first projection 'PX' of minimum pixel values onto the X-axis, with respect to pixels arranged in the X-axis direction, and the second projection 'PY' of minimum pixel values onto the Y-axis, with respect to pixels arranged in the Y-axis direction.

Next, the binarizing threshold value obtaining unit 1323 obtains a binarizing threshold value (Step ST13 shown in FIG. 3). The binarizing threshold value obtaining unit 1323 calculates a moving average 'PXA' on the basis of the minimum pixel values of the first projection 'PX'; which are the minimum brightness values in the present embodiment; and then the moving average 'PXA' is specified as a threshold value for the rectangular area (the specified area).

Next, the position detecting unit 1324 calculates a character segmenting position on the basis of the binarizing threshold value being as a final value (Step ST14 shown in FIG. 3).

Explained herewith is a concrete method to be carried out in the binarizing threshold value obtaining unit.

Wherein a first projection is represented as 'PX(i)' and a moving average is expressed as 'PXA'; the moving average 'PXA' is expressed as a curve shown in FIG. 5B. Wherein an 'n'-th point in the first projection 'PX' is represented as 'PX(n)' and an averaged interval width is represented as '(2W+1)' as shown in FIG. 6; a moving average 'PXA(n)' at the point 'n' is calculated as the following expression shows:

$$PXA(n) = \frac{\sum_{i=n-W}^{n+W} PX(i)}{2W+1} \quad \text{(Expression 1)}$$

In reality, an 'n+1'-th moving average 'PXA(n+1)' is calculated with an expression shown below, by use of a calculation result of the 'n'-th moving average 'PXA(n)'. By asymptotically executing a calculation in this way with respect to 'n'=1, . . . , and 'N'; a threshold value curve (moving average 'PXA') can be calculated effectively.

$$PXA(n+1) = PXA(n) - \frac{PX(n-W)}{2W+1} + \frac{PX(n+1+W)}{2W+1} \quad \text{(Expression 2)}$$

The above-mentioned process corresponds to a process, in which the binarizing threshold value obtaining unit 1323 creates a minimum pixel curve (a minimum brightness curve), by way of calculating the minimum pixel values (the minimum brightness values) of the first projection 'PX' created in the projection creating unit 1322; and calculates a moving average of the minimum pixel curve (the minimum brightness curve) to carry out smoothing on the datum so as to obtain an averaged pixel curve 'PXA' (an averaged brightness curve).

Then, if a binarizing process is carried out on the image shown in FIG. 5A by using the obtained moving average 'PXA' as a binarizing threshold value, a binarized image is obtained as shown in FIG. 7. It is understood that the image shown in FIG. 7 includes only a small amount of noise and brings a favorable result even in the case where clarity between a character string and a background in an image as a binarizing target is significantly deteriorated totally or partially. This is because a use of a moving average for obtaining a binarizing threshold value brings an excellent tracking performance for a brightness distribution of pixels around an objective pixel.

(Overall Operation of the Character Recognition Apparatus)

Overall Operation of the Character Recognition Apparatus 10 according to the present embodiment is explained next, in association with FIG. 8. FIG. 8 is a flowchart for explaining overall operation of the character recognition apparatus 10 according to the present embodiment.

Step ST101

With respect to an OCR character string printed in the OCR character recording area 21 of the recording medium 20 such as a card; at a time when the recording medium is transferred along a transfer guide of a medium transfer mechanism 111, a character pattern of the OCR character string is read out by one-dimensional imaging element 11, and then a photoelectric conversion is carried out (Step ST101).

Step ST102:

A signal obtained by way of the photoelectric conversion is amplified by an amplifier, and converted into a digital signal by an A/D converter, and then the digital signal is stored in the image memory 12 (Step ST102).

Step ST103: by a Character String Segmenting Unit

Next, the line segmenting unit 131 carries out line segmentation (Step ST103). More specifically to describe; the line segmenting unit 131 reads out an image datum from the image memory 12, and then the character string is projected in the X-axis direction, in order to detect upper and lower edges. Then, in the line segmenting unit 131, a center position between the upper and lower edges is identified as a center line of the character string, in order to carry out the line segmentation.

Step ST104:

Next, in the character segmenting unit 132 including the character segmenting position detecting unit 1320, character segmentation is carried out (Step ST104). More specifically to describe; in the character segmenting position detecting unit 1320 of the character segmenting unit 132, the area setting unit 1321 sets up the temporary rectangular segmenting area 'RCTA' that surrounds a plurality of characters as a recognition target. Then, a projection is created in the projection creating unit 1322, with respect to the rectangular area.

The projection creating unit 1322 creates, for example, the first projection 'PX' of minimum pixel values onto the X-axis, with respect to pixels arranged in the X-axis direction, and the second projection 'PY' of minimum pixel values onto the Y-axis, with respect to pixels arranged in the Y-axis direction, in the rectangular area 'RCTA' set up by the area setting unit 1321.

Next, in the binarizing threshold value obtaining unit 1323; a moving average 'PXA' is calculated on the basis of the minimum pixel values (the minimum brightness values in this case example) of the first projection 'PX' created in the projection creating unit 1322, and then the moving average 'PXA' is used as a threshold value for the rectangular area 'RCTA' (the specified area). More specifically to describe; in the binarizing threshold value obtaining unit 1323, a minimum brightness curve is created, by way of calculating the minimum brightness values of the first projection 'PX' created in the projection creating unit 1322. Then, in the binarizing threshold value obtaining unit 1323, a moving average of the minimum brightness curve obtained is calculated in order to carry out smoothing, so as to obtain an averaged brightness curve; and the averaged brightness curve is used as a binarizing threshold value for segmenting a character in the rectangular area (the specified area).

Next, in the position detecting unit 1324, a border position between characters is detected by way of using the obtained threshold value; and then, a binarized image, in which a character is segmented according to the detected border position, is obtained. A subsequent process is carried out by using the binarized image that is a black-and-white image.

When a process of Step ST104 finishes, a circumscribing rectangular area (i.e., coordinate values of an upper end, a lower end, a right end, and a left end) of characters as a recognition target is calculated.

Step ST105:

Next, characteristic extraction is carried out (Step ST105) in the characteristic extracting unit 133. More specifically to describe; in the characteristic extracting unit 133, the above described circumscribing rectangular area is divided into arbitrary sub areas (for example; by way of dividing one circumscribing rectangular area into 5×5 areas, and then, each of those areas is dealt with as a sub area). With respect to each sub area, a ratio of the number of black pixels to the number of all pixels in the sub area is calculated in order to create a characteristic vector that includes the calculated ratio as each element.

Step ST106:

Next, a characteristic comparison is made (Step ST106) in the characteristic comparator unit 134. More specifically to describe, in the characteristic comparator unit 134, the characteristic vector calculated at Step 105 is compared with the reference characteristic vectors that are calculated in advance with regard to all characters to be used for the medium, and stored beforehand in the characteristic dictionary storage unit 135. Then, a character corresponding to a reference characteristic vector, which shows a highest level of similarity (for example, a normalized correlation coefficient), is set up as a candidate character.

Step ST107:

At the end, character recognition is carried out (Step ST107). More specifically to describe, the candidate character, which is set up by means of the characteristic comparison at Step ST106, is recognized as a character used in the medium.

As described above, according to the present embodiment; the character recognition apparatus 10 sets up the temporary rectangular segmenting area 'RCTA' that surrounds a plurality of characters as a recognition target; and then creates a projection with respect to the rectangular area 'RCTA'. At a time of creating the projection, in the rectangular area 'RCTA' (the specified area); the character recognition apparatus 10 creates the first projection 'PX' of pixel values onto the X-axis, with respect to pixels arranged in the character placement direction in which the characters are placed (and the second projection 'PY' of pixel values onto the Y-axis, with respect to pixels arranged in the direction perpendicular to the character placement direction). The character recognition apparatus 10 calculates the moving average 'PXA' on the basis of the minimum pixel values; i.e., the minimum brightness values in the present embodiment; of the first projection 'PX', and then uses the moving average 'PXA' as the binarizing threshold value for the rectangular area (the specified area). More specifically to describe; the character recognition apparatus 10 creates the minimum pixel curve (a minimum brightness curve), by way of calculating the minimum pixel values (the minimum brightness values in the present embodiment) of the first projection 'PX'; and calculates the moving average of the minimum pixel curve (the minimum brightness curve) to carry out smoothing, so as to calculate the averaged pixel curve (an averaged brightness curve), and obtain the averaged pixel curve (the averaged brightness curve) as the binarizing threshold value for segmenting a character in the rectangular area (the specified area). Then, the character recognition apparatus 10 calculates a character segmenting position on the basis of the binarizing threshold value obtained.

(Primary Advantageous Effect of the Present Embodiment)

Therefore, in accordance with the present embodiment, an advantageous effect can be obtained as described below. According to the present embodiment, at the time of carrying out the image binarizing process; the first projection 'PX' (or the projection 'PY') of pixel values onto the X-axis, with respect to pixels arranged in the character placement direction (the X-axis direction), is calculated in relation to the rectangular area 'RCTA' (the specified area) including a character string as a character recognition target; and the moving average 'PXA' is calculated on the basis of the minimum pixel values, i.e., the minimum brightness values in the present embodiment, of the first projection 'PX'; and then the moving average 'PXA' is used as the binarizing threshold value for the rectangular area (the specified area). As a result, according to the present embodiment; it becomes possible to prevent the binarizing threshold value from being biased toward a background side. As a result of that, it becomes possible to prevent a character line work from becoming unnecessarily thick in the binarized image. Furthermore, even under conditions of an image in which clarity between a character and a background fluctuates, a binarized process result having a high accuracy can be obtained. Then, as a result, it becomes possible to obtain a favorable binarized image. As a result of that, character recognition performance can be improved.

Moreover, in the present embodiment; wherein the averaged pixel curve being obtained by way of a moving average process on the minimum pixel curve according to the minimum pixel values of the projection, the binarizing threshold value obtaining unit 1323 specifies the averaged pixel curve as a threshold value corresponding to a pixel position of the character placement direction. According to the present embodiment, the moving average is used as the threshold value so that a tracking performance for a distribution (a brightness distribution) of pixels around an objective pixel is improved; and as a result of that, a favorable binarized image can be obtained.

Moreover, in the present embodiment; the binarizing threshold value obtaining unit 1323 creates the minimum pixel curve by way of calculating the minimum pixel values of the projection, and calculates a moving average of the minimum pixel curve to carry out smoothing so as to obtain the averaged pixel curve; and then specifies the averaged pixel curve as a threshold value corresponding to a pixel position of the character placement direction. According to the present embodiment; the image binarizing process is carried out, not by way of using a pixel value obtained by optimally dividing the minimum pixel curve in half as a threshold value, but by way of using an averaged pixel curve 'PXA' obtained by the moving average process on the minimum pixel curve as the threshold value, with respect to the rectangular area including a character string as a recognition target; so that the binarizing threshold value can appropriately be specified. Therefore, a tracking performance for a distribution (a brightness distribution) of pixels around an objective pixel is improved; and as a result of that, a favorable binarized image can be obtained.

Furthermore, in the present embodiment, the projection creating unit 1322 creates the second projection 'PY' of pixel values, with respect to pixels arranged in the direction perpendicular to the character placement direction. Thus, with respect to a chosen line, it becomes possible to define a position of a character of the line, in a direction perpendicular to the character placement direction.

Other Embodiments

The character recognition apparatus 10 according to the present embodiment can be applied not only to a type-printed character but also to a hand-written character, as a recognition target. Moreover, the character recognition apparatus 10 can be applied not only to character recognition, but also to decoding a one-dimensional or two-dimensional barcode, for the purpose of ensuring an appropriate black-and-white ratio in a bar width. Furthermore, the character recognition apparatus 10 according to the present embodiment can be applied not only to a card but also to any kind of recording medium, such as a passport, a driver license, and the like.

Furthermore, according to the present embodiment; even when the present method is applied to a situation in which a border between characters is clear enough, the same result can be obtained.

Incidentally, the method explained above in detail can be so configured as to be created as a program according to the procedures described above, for being executed by a computer such as a CPU. Then, with the program being stored in a recording medium, such as a semiconductor memory, a magnetic disc, an optical disc and a Floppy (a registered trademark) disc; the method can be configured in such a way that the computer, in which the recording medium is installed, accesses the program in order to execute the program.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A character segmenting apparatus for segmenting each character out of a character string, by processing an image datum obtained by way of imaging the character string positioned on a recording medium, the character segmenting apparatus comprising:
    a character segmenting position detecting unit configured to detect a segmenting position of characters constituting the character string;
    wherein, the character segmenting position detecting unit comprises:
    an area setting unit configured to set up an area for detecting the segmenting position of characters;
    a projection creating unit configured to create a projection of pixel values, with respect to pixels arranged in a character placement direction in which the characters are placed, at least in a specified area set up by the area setting unit;
    a binarizing threshold value obtaining unit configured to calculate a moving_average on the basis of minimum pixel values of the projection, in order to specify the moving average as a binarizing threshold value for the specified area; and
    a position detecting unit configured to calculate a character segmenting position on the basis of the binarizing threshold value obtained by the binarizing threshold value obtaining unit.

2. The character segmenting apparatus according to claim 1;
    wherein, the binarizing threshold value obtaining unit is configured to specify an_averaged pixel curve as a binarizing threshold value corresponding to a pixel position of the character placement direction, the averaged pixel curve being obtained by way of a moving average process on a minimum pixel curve according to the minimum pixel values of the projection.

3. The character segmenting apparatus according claim 1;
    wherein, the binarizing threshold value obtaining unit is configured to create the minimum pixel curve by way of calculating the minimum pixel values of the projection, and calculate a moving average of the minimum pixel curve to carry out smoothing so as to obtain the averaged pixel curve; and then specify the averaged pixel curve as a binarizing threshold value corresponding to a pixel position of the character placement direction.

4. The character segmenting apparatus according to claim 1;
wherein, the projection creating unit is configured to create a projection of pixel values, with respect to pixels arranged in a direction perpendicular to the character placement direction.

5. A character recognition apparatus for segmenting each character out of a character string segmented from an image datum, and recognizing the character, the character recognition apparatus comprising:
an image reading unit configured to image the character string positioned on a recording medium and read the character string as the image datum;
an image memory configured to store the image read by the image reading unit; and
a data processing unit configured to segment the character string from the image datum stored in the image memory, and segment a character out of the character string, and recognize the character;
wherein, the data processing unit comprises a character segmenting unit provided with a character segmenting position detecting unit configured to detect a segmenting position of characters constituting the character string segmented; and
the character segmenting position detecting unit comprises:
an area setting unit configured to set up an area for detecting the segmenting position of characters;
a projection creating unit configured to create a projection of pixel values, with respect to pixels arranged in a character placement direction in which the characters are placed, at least in a specified area set up by the area setting unit;
a binarizing threshold value obtaining unit configured to calcualte a moving_average on the basis of minimum pixel values of the projection, in order to specify the moving average as a binarizing threshold value for the specified area; and
a position detecting unit configured to calculate a character segmenting position on the basis of the binarizing threshold value obtained by the binarizing threshold value obtaining unit.

6. The character recognition apparatus according to claim 5;
wherein, the binarizing threshold value obtaining unit is configured to specify an_averaged pixel curve as a binarizing threshold value corresponding to a pixel position of the character placement direction, the averaged pixel curve being obtained by way of a moving average process on a minimum pixel curve according to the minimum pixel values of the projection.

7. The character recognition apparatus according to claim 5;
wherein, the binarizing threshold value obtaining unit is structured to create the minimum pixel curve by way of calculating the minimum pixel values of the projection, and calculate a moving average of the minimum pixel curve to carry out smoothing so as to obtain the averaged pixel curve; and then specify the averaged pixel curve as a binarizing threshold value corresponding to a pixel position of the character placement direction.

8. The character recognition apparatus according to claim 5;
wherein, the projection creating unit is configured to create a projection of pixel values, with respect to pixels arranged in a direction perpendicular to the character placement direction.

9. A character segmenting method for segmenting each character out of a character string, by processing an image datum obtained by way of imaging the character string positioned on a recording medium, the character segmenting method comprising;
detecting a character segmenting position for detecting a segmenting position of characters constituting the character string;
wherein, the detecting a character segmenting position comprises;
setting an area in order to set up an area for detecting the segmenting position of characters;
creating a projection in order to create a projection of pixel values, with respect to pixels arranged in a character placement direction in which the characters are placed, at least in a specified area set up by the setting an area;
obtaining a binarizing threshold value in order to calculate a moving average on the basis of minimum pixel values of the projection, and to specify the moving average as a binarizing threshold value for the specified area; and
detecting a position in order to calculate a character segmenting position on the basis of the binarizing threshold value obtained by the step of obtaining a binarizing threshold value.

10. The character segmenting method according to claim 9;
wherein, the obtaining a binarizing threshold value specifies an averaged pixel curve as a binarizing threshold value corresponding to a pixel position of the character placement direction, the averaged pixel curve being obtained by way of a moving average process on a minimum pixel curve according to the minimum pixel values of the projection.

11. The character segmenting method according to claim 9;
wherein, the obtaining a binarizing threshold value creates the minimum pixel curve by way of calculating the minimum pixel values of the projection, and calculates a moving average of the minimum pixel curve to carry out smoothing so as to obtain the averaged pixel curve; and then specifies the averaged pixel curve as a binarizing threshold value corresponding to a pixel position of the character placement direction.

12. The character segmenting method according to claim 9;
wherein, the creating a projection creates a projection of pixel values, with respect to pixels arranged in a direction perpendicular to the character placement direction.

* * * * *